US011523352B2

(12) United States Patent
Zheng et al.

(10) Patent No.: US 11,523,352 B2
(45) Date of Patent: Dec. 6, 2022

(54) TRANSMIT POWER INDICATION METHOD, TRANSMIT POWER RECEIVING METHOD, NETWORK DEVICE AND ACCESS DEVICE

(71) Applicants: China Mobile Communication Co., Ltd Research Institute, Beijing (CN); China Mobile Communications Group Co., Ltd., Beijing (CN)

(72) Inventors: Yi Zheng, Beijing (CN); Dan Wu, Beijing (CN); Jing Dong, Beijing (CN); Xueying Hou, Beijing (CN)

(73) Assignees: China Mobile Communication Co., Ltd Research Institute, Beijing (CN); China Mobile Communications Group Co., Ltd., Beijing (CN)

( * ) Notice: Subject to any disclaimer, the term of this patent is extended or adjusted under 35 U.S.C. 154(b) by 32 days.

(21) Appl. No.: 17/058,236

(22) PCT Filed: Jun. 27, 2019

(86) PCT No.: PCT/CN2019/093283
§ 371 (c)(1),
(2) Date: Nov. 24, 2020

(87) PCT Pub. No.: WO2020/001541
PCT Pub. Date: Jan. 2, 2020

(65) Prior Publication Data
US 2021/0195534 A1 Jun. 24, 2021

(30) Foreign Application Priority Data

Jun. 29, 2018 (CN) .................. 201810695652.X

(51) Int. Cl.
*H04W 52/04* (2009.01)
*H04W 52/36* (2009.01)
(Continued)

(52) U.S. Cl.
CPC ......... *H04W 52/36* (2013.01); *H04W 52/146* (2013.01); *H04W 52/54* (2013.01);
(Continued)

(58) Field of Classification Search
CPC ..... H04W 52/32; H04W 52/36; H04W 52/54; H04J 1/00
See application file for complete search history.

(56) References Cited

U.S. PATENT DOCUMENTS

2012/0028627 A1 2/2012 Hunzinger
2012/0083201 A1 4/2012 Truong et al.
(Continued)

FOREIGN PATENT DOCUMENTS

CN 102196496 A 9/2011
CN 102726097 A 10/2012
(Continued)

*Primary Examiner* — Tu X Nguyen
(74) *Attorney, Agent, or Firm* — Price Heneveld LLP

(57) ABSTRACT

A transmit power indication method, a transmit power receiving method, a network device and an access device are provided. The transmit power indication method is applied to a network device, and includes transmitting indication information on a first link of the network device, wherein the indication information is used to indicate current transmit power of the first link of the network device, or to indicate a transmit power offset of the first link, wherein the transmit power offset is a difference between the current transmit power of the first link and transmit power of the network device before the network device transmits the indication information.

20 Claims, 6 Drawing Sheets

(51) Int. Cl.
      *H04W 52/14*     (2009.01)
      *H04W 52/54*     (2009.01)
      *H04W 72/04*     (2009.01)
      *H04W 88/14*     (2009.01)

(52) U.S. Cl.
      CPC ..... *H04W 72/042* (2013.01); *H04W 72/0473* (2013.01); *H04W 88/14* (2013.01)

(56) References Cited

U.S. PATENT DOCUMENTS

| | | | |
|---|---|---|---|
| 2012/0196528 A1* | 8/2012 | Kazmi | H04W 52/46 |
| | | | 455/9 |
| 2012/0281614 A1 | 11/2012 | Deng et al. | |
| 2012/0327794 A1 | 12/2012 | Han et al. | |
| 2016/0205695 A1 | 7/2016 | Kishiyama et al. | |
| 2021/0250884 A1* | 8/2021 | Iyer | H04W 56/0045 |

FOREIGN PATENT DOCUMENTS

| | | |
|---|---|---|
| CN | 102811469 A | 12/2012 |
| CN | 103327593 A | 9/2013 |
| CN | 103906246 A | 7/2014 |
| CN | 105472623 A | 4/2016 |
| CN | 102149205 A | 6/2016 |

\* cited by examiner

TRANSMIT POWER INDICATION METHOD, TRANSMIT POWER RECEIVING METHOD, NETWORK DEVICE AND ACCESS DEVICE

CROSS-REFERENCE TO RELATED APPLICATION

The present application is a U.S. national phase application of a PCT Application No. PCT/CN2019/093283 filed on Jun. 27, 2019, which claims a priority of Chinese patent application No. 201810695652.X filed in China on Jun. 29, 2018, a disclosure of which is incorporated herein by reference in its entirety.

TECHNICAL FIELD

The present disclosure relates to the field of communication technology, in particular to a transmit power indication method, a transmit power receiving method, a network device, and an access device.

BACKGROUND

As shown in FIG. 1, a self-backhaul technology uses high-frequency air interface transmission to replace optical fiber backhaul, and backhauls data to a site with an optical fiber transmission capability via a multi-hop link. For example, a base station B and a base station C backhaul data to a base station A with an optical fiber transmission capability via a backhaul link.

Resources may be allocated for a backhaul link (BH) and an access link in the following manners: time division multiplexing (TDM), frequency division multiplexing (FDM), or space division multiplexing (SDM). FIG. 2 is a schematic diagram illustrating a case in which the backhaul link and the access link are time-division multiplexed (TDM). FIG. 3 is a schematic diagram illustrating a case in which the backhaul link and the access link are frequency-division multiplexed (FDM). FIG. 4 is a schematic diagram illustrating a case in which the backhaul link and the access link are space-division multiplexed (SDM).

In FIG. 4, in order to ensure a full utilization of resources, when an integrated access and backhaul (IAB) relay station is in a backhaul or transmitting process, the IAB relay station may perform backhaul link (BH) transmission and link transmission corresponding to the IAB serving user equipment (UE) simultaneously, that is, an SDM of IAB backhaul and access links.

As shown in FIG. 5 and FIG. 6, in a slot 2, IAB is to perform backhaul and serve UE in its cell. For UE that accesses an IAB (AC-UE), the IAB is a serving cell. In a case that an IAB-1 does not perform backhaul, the UE may determine transmit power of a downlink reference symbol, such as a synchronization signal and PBCH block (SSB) and a channel state information reference signal (CSI-RS), according to energy per resource element (EPRE, also referred to as reference power) in broadcast information of an IAB-1 base station. Based on the transmit power, UE may perform beam management and measurement of a neighboring cell.

In a case that SDM transmission of an backhaul link and an access link is performed by IAB-1, UE accessing the IAB is unaware of the transmit power corresponding to PBH, and the UE still performs beam management and measurement of a neighboring cell by using EPRE, resulting in problems in beam management or inaccurate measurement of the neighboring cell.

SUMMARY

A transmit power indication method, a transmit power receiving method, a network device and an access device are provided in the present disclosure, such that when a backhaul link and an access link of the network device are space-division multiplexed and/or share power, a device in the access link may accurately acquire power of the access link to perform beam management and measurement of a neighboring cell, thereby avoiding measurement failure or inaccuracy caused by the use of total power for the beam management and measurement.

To solve the above technical problems, the following solutions are provided in some embodiments of the present disclosure.

A transmit power indication method is applied to a network device, and includes: transmitting indication information on a first link of the network device, where the indication information is used to indicate current transmit power of the first link of the network device, or to indicate a transmit power offset of the first link, where the transmit power offset is a difference between the current transmit power of the first link and transmit power of the network device before the network device transmits the indication information.

Optionally, the transmitting the indication information on the first link of the network device includes: in a case that a second link and the first link of the network device are space-division multiplexed and/or share power to be transmitted, transmitting the indication information on the first link of the network device.

Optionally, the first link is an access link between the network device and UE or a next hop node of the network device, and the second link is a backhaul link between the network device and a previous hop node of the network device.

Optionally, backhaul power of the backhaul link is less than or equal to a transmit power offset of the access link.

Optionally, in a case that the network device has at least two backhaul links, a sum of the backhaul power of the at least two backhaul links of the network device is less than or equal to the transmit power offset of the first link.

Optionally, in a case that the previous hop node on the second link of the network device is switched from a first node to a second node, the indication information is used to indicate updated current transmit power or an updated transmit power offset of the first link of the network device.

Optionally, the current transmit power is less than or equal to the transmit power of the network device before the network device transmits the indication information minus backhaul power of the backhaul link.

Optionally, the transmit power indication method further includes: when the backhaul link and the access link of the network device finish being space-division multiplexed and/or sharing power to be transmitted, resuming the transmit power of the network device before the network device transmits the indication information.

Optionally, the resuming the transmit power of the network device before the network device transmits the indication information includes: transmitting downlink control information (DCI) or radio resource control (RRC) signaling or medium access control control element (MAC CE) signaling, where the DCI or the RRC signaling or the MAC CE signaling is used to indicate that transmit power of the access link of the network device resumes the transmit power of the network device before the network device transmits the indication information; or resuming the transmit power of the network device before the network device transmits the indication information automatically according to a protocol when a time instant at which the backhaul link and the access link of the network device finish being space-division multiplexed and/or sharing power to be transmitted arrives.

Optionally, the transmitting indication information includes: transmitting the indication information via radio resource control (RRC) signaling or medium access control control element (MAC CE) signaling or downlink control information (DCI).

Optionally, the current transmit power is used to transmit a synchronization signal and PBCH block (SSB) and/or a channel state information reference symbol (CSI-RS).

A transmit power receiving method is further provided in some embodiments of the present disclosure. The method is applied to an access device and includes: receiving indication information on a first link of a network device, where the indication information is used to indicate current transmit power of the first link of the network device, or to indicate a transmit power offset of the first link, where the transmit power offset is a difference between the current transmit power of the first link and transmit power of the network device before the network device transmits the indication information.

Optionally, the receiving the indication information on the first link of the network device includes: in a case that a second link and the first link of the network device are space-division multiplexed and/or share power to be transmitted, receiving the indication information on the first link of the network device.

Optionally, the first link is an access link between the network device and UE or a next hop node of the network device, and the second link is a backhaul link between the network device and a previous hop node of the network device.

Optionally, backhaul power of the backhaul link is less than or equal to a transmit power offset of the access link.

Optionally, in a case that the network device has at least two backhaul links, a sum of the backhaul power of the at least two backhaul links of the network device is less than or equal to the transmit power offset of the first link.

Optionally, in a case that the previous hop node on the second link of the network device is switched from a first node to a second node, the indication information is used to indicate updated current transmit power or an updated transmit power offset of the first link of the network device.

Optionally, the current transmit power is less than or equal to the transmit power of the network device before the network device transmits the indication information minus backhaul power of the backhaul link.

A network device is further provided in some embodiments of the present disclosure. The network device includes: a transceiver, configured to transmit indication information on a first link of the network device, where the indication information is used to indicate current transmit power of the first link of the network device, or to indicate a transmit power offset of the first link, where the transmit power offset is a difference between the current transmit power of the first link and transmit power of the network device before the network device transmits the indication information.

Optionally, the transceiver is specifically configured to: in a case that a second link and the first link of the network device are space-division multiplexed and/or share power to be transmitted, transmit the indication information on the first link of the network device.

An access device is further provided in some embodiments of the present disclosure. The access device includes: a transceiver, configured to receive indication information on a first link of the network device, where the indication information is used to indicate current transmit power of the first link of the network device, or to indicate a transmit power offset of the first link, where the transmit power offset is a difference between the current transmit power of the first link and transmit power of the network device before the network device transmits the indication information.

Optionally, the transceiver is configured to: in a case that a second link and the first link of the network device are space-division multiplexed and/or share power to be transmitted, receive the indication information on the first link of the network device.

A communication device is further provided in some embodiments of the present disclosure. The communication device includes: a processor and a memory storing therein a computer program, where the processor is configured to execute the computer program to implement the methods described above.

A computer readable storage medium is further provided in some embodiments of the present disclosure. The computer readable storage medium includes instructions, where the instructions are configured to be executed by a processor to implement the methods described above.

At least following beneficial effects are obtained in the above solutions of the present disclosure.

In the above solutions of the present disclosure, in a case that the backhaul link and the access link of the network device are space-division multiplexed and/or share power, the transmit power or the transmit power offset of the access link is transmitted to the device in the access link, such that the device in the access link may accurately acquire the power of the access link, and perform beam management and measurement of the neighboring cell based on the power of the access link, thereby improving the accuracy of the measurement and avoiding measurement inaccuracy caused by the use of the total power broadcasted by the network device for the beam management and measurement.

DETAILED DESCRIPTION

Figure 1:
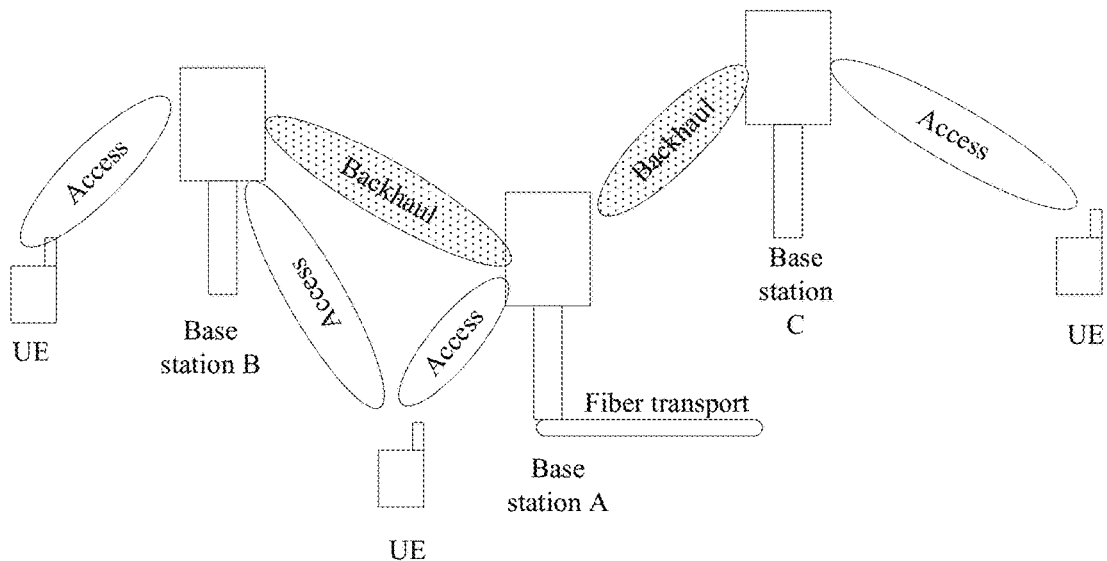
FIG. 1 is a schematic diagram of a basic principle of a backhaul scheme.
Figure 2:
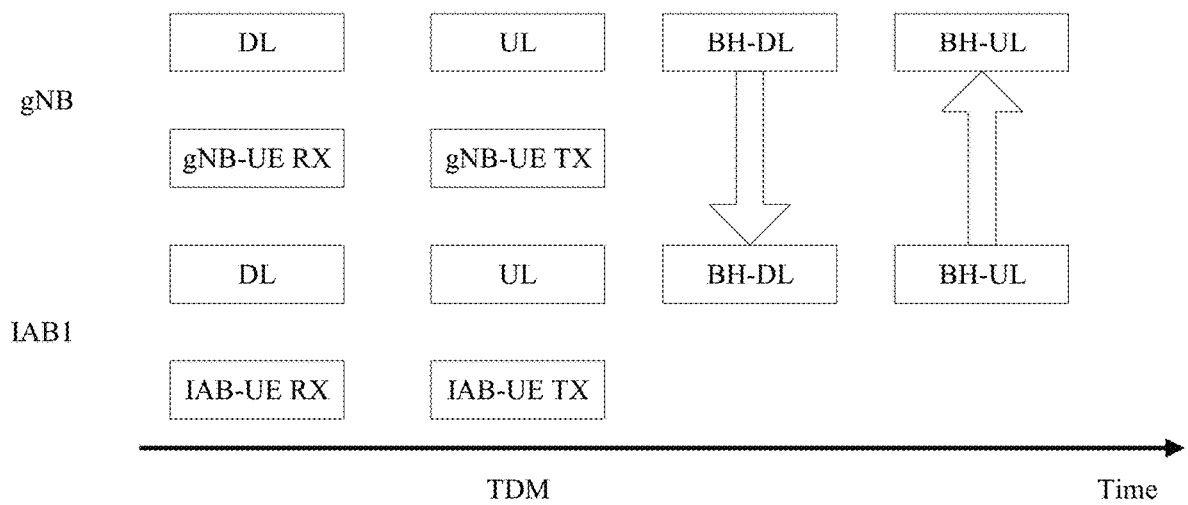
FIG. 2 is a schematic diagram illustrating a case in which a backhaul link and an access link are time-division multiplexed.
Figure 3:
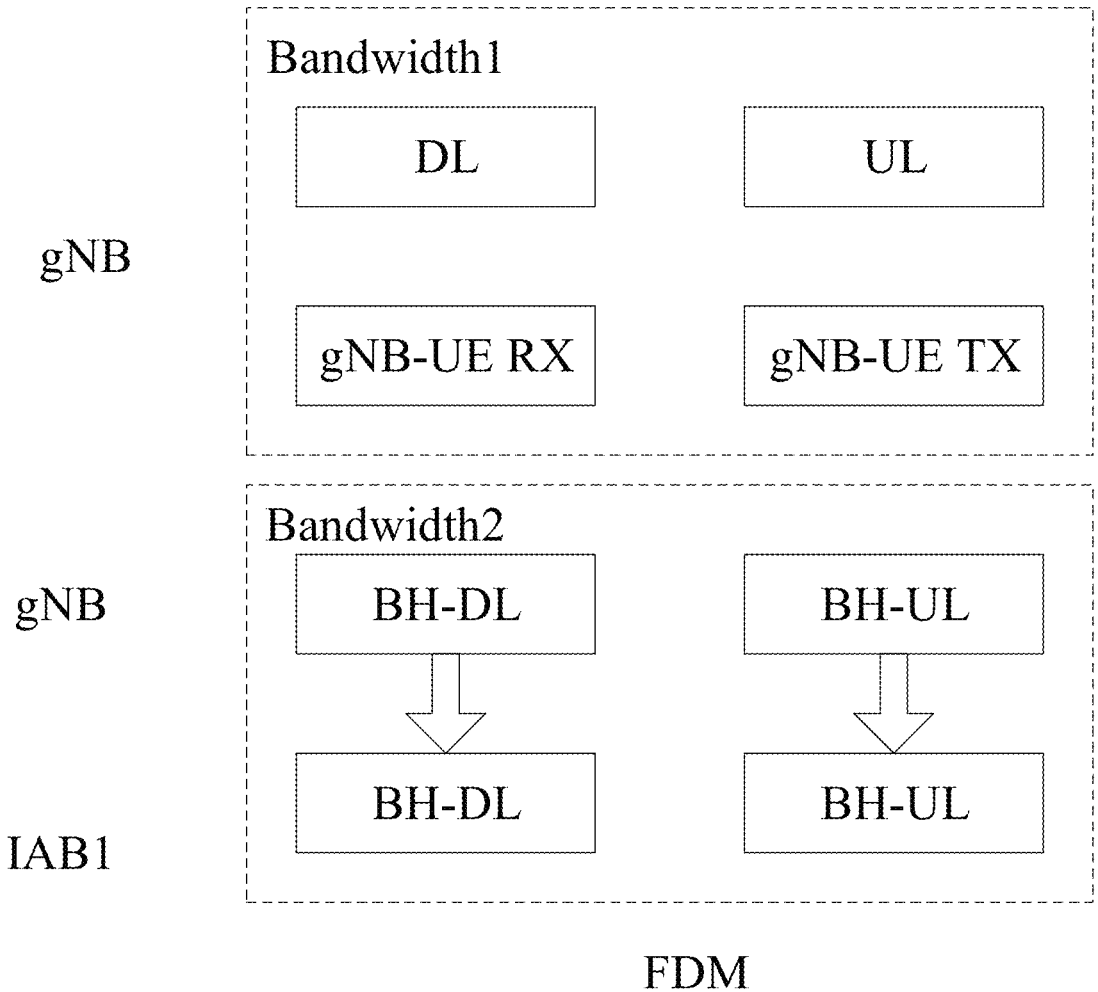
FIG. 3 is a schematic diagram illustrating a case in which a backhaul link and an access link are frequency-division multiplexed.
Figure 4:
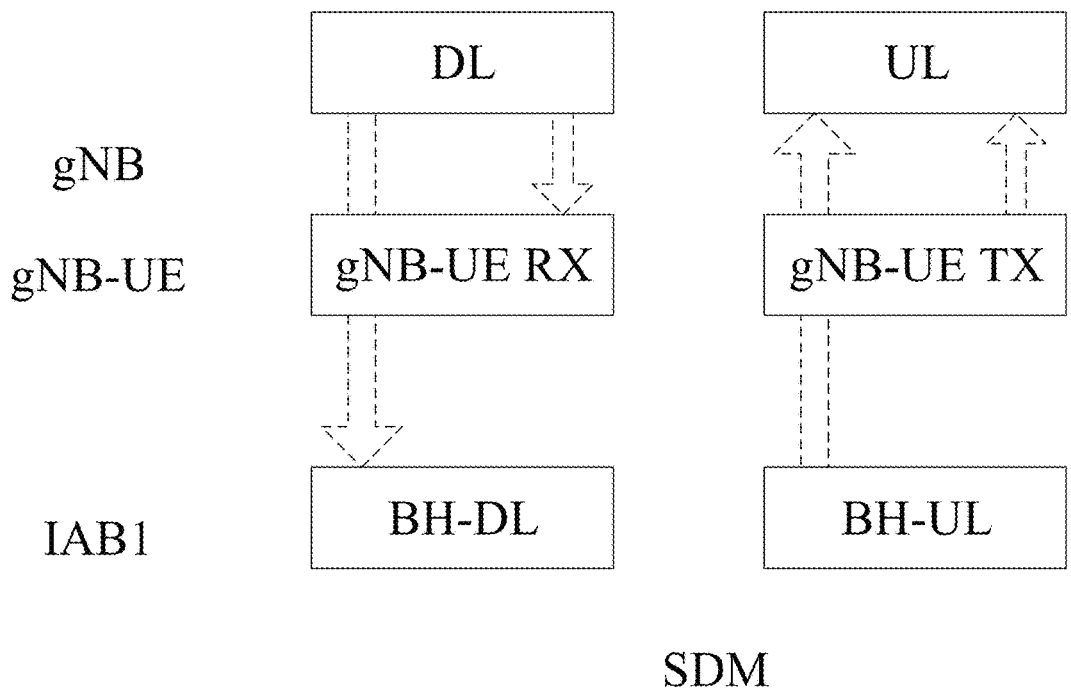
FIG. 4 is a schematic diagram illustrating a case in which a backhaul link and an access link are space-division multiplexed.
Figure 5:
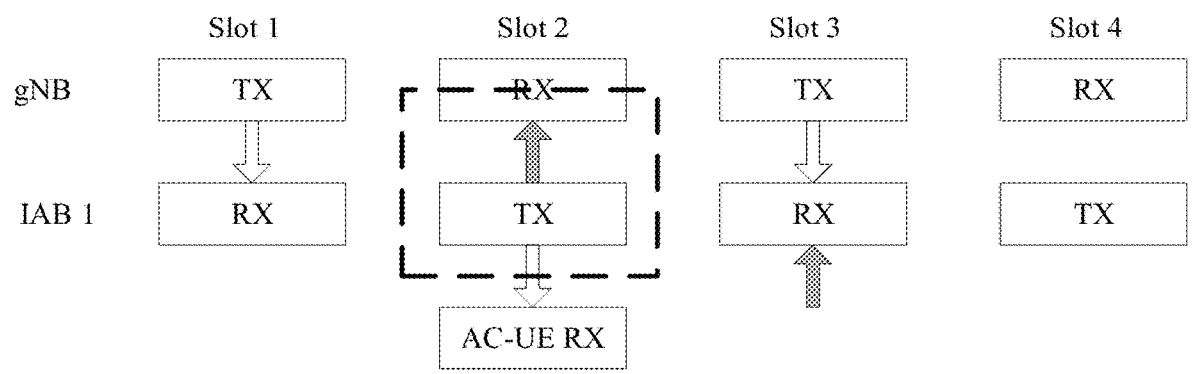
FIG. 5 is a schematic diagram illustrating a case in which an integrated access and backhaul (TAB) performs backhaul and serves UE in its cell in a slot 2.

Exemplary embodiments of the present disclosure will be described hereinafter in more detail with reference to the accompanying drawings. Although exemplary embodiments of the present disclosure are shown in the drawings, it should be appreciated that the present disclosure may be implemented in various forms and should not be limited by the exemplary embodiments. On the contrary, these embodiments are provided to enable a thorough understanding of the present disclosure and to fully convey the scope of the present disclosure to a person skilled in the art.

In view of the problems in the related art that when a backhaul link and an access link of a relay station IAB or a backhaul node are space-division multiplexed or share power, neighboring cell measurement or beam management performed by UE in the access link would be inaccurate or problematic if the UE still uses power broadcasted by the IAB, a transmit power indication method is provided in some embodiments of the present disclosure, such that a device in the access link may accurately acquire power of the access link to perform beam management and measurement of a neighboring cell, instead of performing the beam management and the measurement by using total power broadcasted by the network device, thereby avoiding measurement failure or inaccuracy caused by the use of the total power for the beam management and measurement.

A transmit power indication method is provided in some embodiments of the present disclosure. The method is applied to a network device and includes: step 11, transmitting indication information on a first link of the network device, where the indication information is used to indicate current transmit power of the first link of the network device, or to indicate a transmit power offset of the first link, where the transmit power offset is a difference between the current transmit power of the first link and transmit power of the network device before the network device transmits the indication information. The network device here may be a base station or a network node with backhaul capability such as a relay station IAB.

Figure 6:
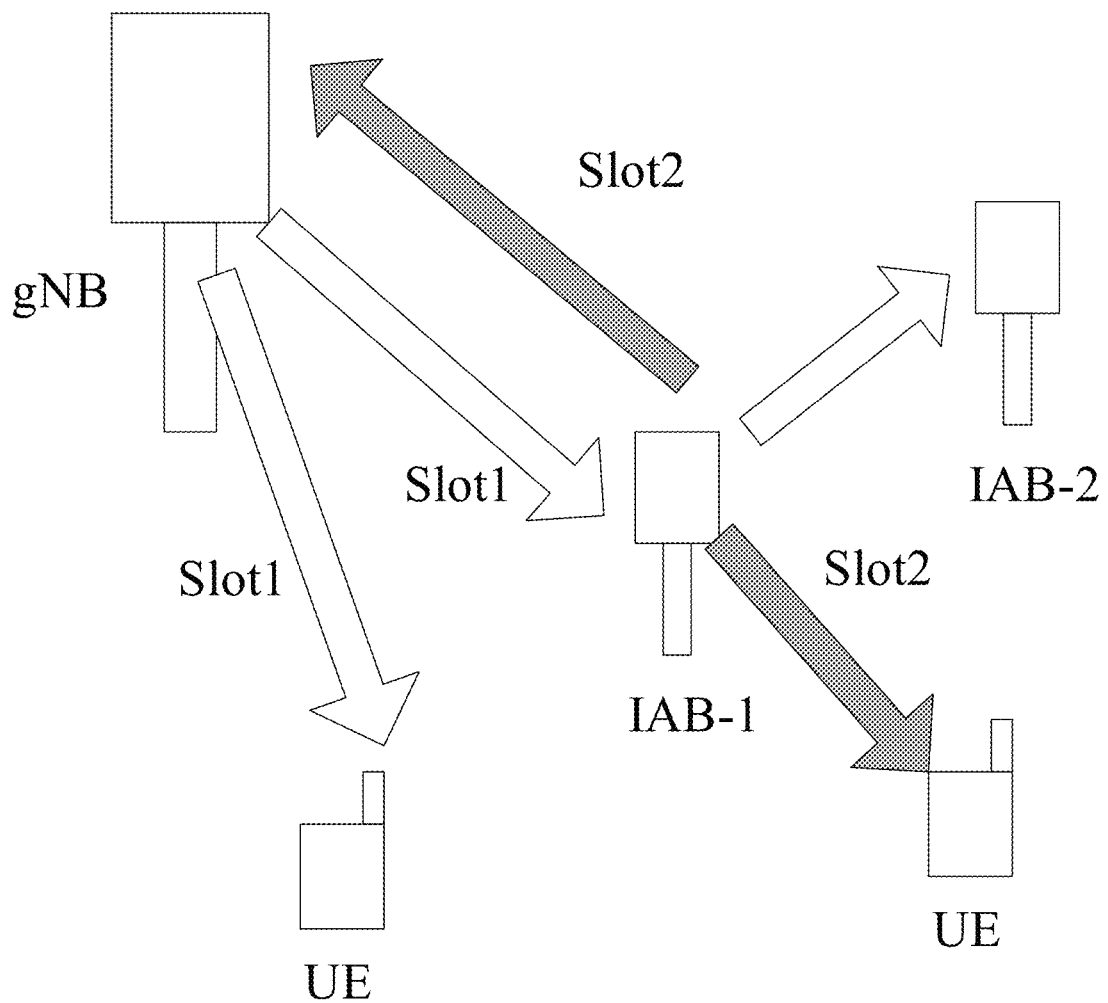
FIG. 6 is a schematic diagram illustrating a case in which a backhaul link and an access link of the IAB are space-division multiplexed in the slot 2.
Figure 7:
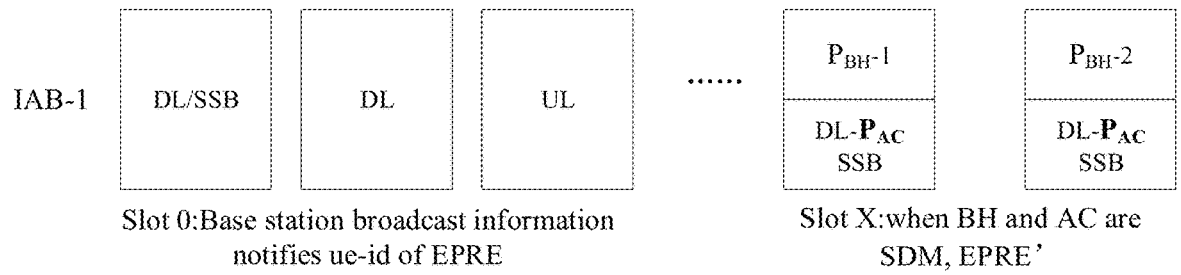
FIG. 7 is a schematic diagram illustrating power EPRE-1 broadcasted by IAB when the backhaul link and the access link are not space-division multiplexed, and transmit power EPRE-2 of the access link transmitted in a slot X when the backhaul link and the access link are space-division multiplexed (SDM)

Specifically, as shown in FIG. 6 and FIG. 7, a first relay station IAB-1 is a backhaul node, which may communicate with its previous hop node gNB (5G base station), and may also communicate with UE in an access link of the IAB-1. A backhaul link between the IAB-1 and the gNB and an access link between the IAB-1 and the UE are space-division multiplexed (SDM).

Further, in the embodiment, the transmitting the indication information on the first link of the network device includes: in a case that a second link and the first link of the network device are space-division multiplexed and/or share power to be transmitted, transmitting the indication information on the first link of the network device. The first link may be an access link between the network device and UE or an access link between the network device and a next hop node of the network device, and the second link may be a backhaul link between the network device and a previous hop node of the network device.

In the embodiment of the present disclosure, backhaul power of the backhaul link is less than or equal to a transmit power offset of the access link. The current transmit power is less than or equal to the transmit power of the network device before the network device transmits the indication information minus backhaul power of the backhaul link. The backhaul power may also be referred to as transmit power on the backhaul link, and the transmit power of the network device before the network device transmits the indication information may also be referred to as total power.

In the related art, when a relay station performs space-division multiplexing or power sharing of an access link and a backhaul link, the UE still performs beam management and neighboring cell measurement by using the total power. In fact, as shown in FIG. 6, when the backhaul link between the IAB-1 and the gNB and the access link between the IAB-1 and the UE are space-division multiplexed (SDM) or share power, power on the access link between the IAB-1 and the UE is less than the total power. The total power here is transmit power that IAB-1 broadcasts on the access link before transmitting the indication information. This is because a part of power needs to be diverted to the backhaul link communication between the IAB-1 and the gNB. However, backhaul power of the backhaul link between the IAB-1 and the gNB is scheduled and configured by the gNB, and the UE cannot know the backhaul power of the backhaul link between IAB-1 and the gNB, as a result, the UE still performs beam management and neighboring cell measurement according to the total power broadcasted by the IAB-1, resulting in measurement inaccuracy.

In some embodiments of the present disclosure, by transmitting the current transmit power of the first link of the network device or the transmit power offset of the first link to the UE, the UE may perform beam management and neighboring cell measurement by directly using the current transmit power, or, after receiving the transmit power offset, the UE may subtract the transmit power offset from the total power received previously to determine the current transmit power of the access link, and perform beam management and neighboring cell measurement by using the current transmit power of the access link, thereby improving the accuracy of measurement.

In the embodiment of the present disclosure, the transmitting indication information may include: transmitting the indication information via radio resource control (RRC) signaling or medium access control control element (MAC CE) signaling or downlink control information (DCI). Certainly, in embodiments of the present disclosure, the means by which the indication information is transmitted is not limited thereto.

In the embodiment of the present disclosure, the current transmit power is used to transmit a synchronization signal and PBCH block (SSB) and/or a channel state information reference symbol (CSI-RS). The SSB may include a primary synchronization signal (PSS), a secondary synchronization signal (SSS) and/or a physical broadcast channel (PBCH) signal.

In a specific embodiment of the present disclosure, when the network device has one backhaul link, the backhaul power of the backhaul link is less than or equal to the transmit power offset of the access link. In other words, the backhaul power allocated by the network device to the backhaul link may be equal to the transmit power offset. At this time, all the transmit power offset is used for communication of the backhaul link, and the transmit power of the access link is equal to the aforementioned total power minus the transmit power offset. Of course, it is not ruled out that, in addition to the backhaul link, there may be other power losses which would give rise to an access link transmit power less than the total power, and in this case, the backhaul power of the backhaul link is less than the transmit power offset.

In a specific embodiment of the present disclosure, when the network device has at least two backhaul links, i.e., when the network device is in communication connection with at least two previous hop nodes, a sum of the backhaul power of the at least two backhaul links of the network device is less than or equal to the transmit power offset of the first link.

For example, multiple upper-level backhaul nodes IAB_P1, IAB_P2, IAB_P3, . . . , IAB_PN are configured for the IAB_1. The backhaul nodes correspond to different uplink transmission backhaul links $P_{\_BH\_1}, \ldots, P_{\_BH\_N}$, respectively, which correspond to backhaul power: P_offset_1, . . . , P_offset_N, respectively. The IAB informs user equipment (UE) and a lower-level IAB node of a specific power offset via RRC or MAC CE. Backhaul power of one backhaul link is $P_{IAB\_BH}$=P0+alpha*PL, where P0 is target received power, PL is transmission power loss, and alpha is a coefficient. That is, P_offset_1=P01+alpha1*PL1, . . . , and so on.

The IAB informs the UE that the transmit power of the access link is EPRE (i.e., the aforementioned total power) via broadcast information. When a user configures that transmission occurs between the IAB and UE 1 or the IAB and a lower-level node IAB_child_1, the UE or the IAB_child_1 performs power measurement in accordance with the ERPE, such as calculating L1_RSRP, L3_RSRP, PL, etc.

When it is configured that backhaul link transmission toward an upper-level node and an access link of the UE 1 or the IAB_child_1 of the IAB are space-division multiplexed or share power to be transmitted, the IAB_1 supports, according to an upper-level backhaul node (e.g., a gNB), specific backhaul power or an index of backhaul power, and the IAB_1 transmits the backhaul power or the index of backhaul power to the UE, such that the UE may determine access power of the access link according to the backhaul power or the index of backhaul power. Or, the access power of the access link may be directly transmitted to the UE. The UE or the IAB_child performs measurement and detection of related information according to ERPE'=EPRE-offset, where ERPE' is transmit power of the access link of the IAB_1, EPRE is total power broadcasted on the access link before the IAB_1 transmits indication information, and offset is a transmit power offset of the access link. The transmit power offset is equal to or greater than the backhaul power of one backhaul link of the IAB_1, or equal to or greater than a sum of the backhaul power of multiple backhaul links of the IAB_1.

For example, when there are multiple upper-level backhaul nodes, offset is a sum of the backhaul power of the backhaul links between the IAB and all backhaul nodes, i.e., offset is P_offset_1+P_offset_2+ . . . +P_offset_N.

Certainly, when there are multiple UE on the access link, or when there are multiple next hop IAB nodes on the access link, or when there are multiple UE and next hop IABs on the access link, ERPE' is a sum of power of multiple UE or multiple next-hop IABs or multiple UE and next hop IABs. In a case that the number of UE is N, access power allocated to each UE is ERPE'/N. Of course, the access power may be allocated by using other manners. That is, in a case that there are multiple access links, the current transmit power is a sum of transmit power of the multiple access links.

In addition, in the above embodiment of the present disclosure, in a case that the previous hop node of the backhaul link of the network device is switched from a first node to a second node, the indication information is used to indicate updated current transmit power or an updated transmit power offset of the first link of the network device. Here, the updated current transmit power is less than or equal to the transmit power of the network device before the network device transmits the indication information minus the updated transmit power offset.

For example, when the IAB_1 is switched from a current upper-level IAB_P1 to IAB_P2, the IAB indicates a specific updated power offset or ERPE' to the UE it serves and/or IAB_child node. The UE and the IAB_child perform measurement according to the updated offset or ERPE'. The updated ERPE' is equal to EPRE-P1, where P1 is backhaul power of the backhaul link between the IAB_1 and the IAB_P2, and the updated offset is equal to or greater than P1.

A kind of power offset is introduced in the embodiment of the present disclosure. For example, the offset is transmit power of an upper-level backhaul performed by the IAB, i.e., backhaul power PBH of the backhaul link. When the IAB has multiple upper-level backhaul nodes, multiple sets of PBH may be configured. When UE served by the IAB or a lower-level node performs a space-division multiplexed transmission of a backhaul link and an access link, the UE calculates downlink channel information, such as RSRP, PL, etc., according to an updated EPRE', where EPRE'=EPRE−offset. When the base station configures for the UE that the access link and the backhaul link (BH) are space-division multiplexed (SDM), the base station informs the UE of the power offset (offset), or indicates to the UE that an updated EPRE' is to be used, such that the UE determines EPRE' according to the updated offset or performs neighboring cell measurement directly according to EPRE', thereby improving the accuracy of the neighboring cell measurement.

Further, in some embodiments of the present disclosure, when the backhaul link and the access link of the network device finish being space-division multiplexed and/or sharing power to be transmitted, the network device may resume the transmit power of the network device before the network device transmits the indication information. That is, when the backhaul link and the access link of the IAB_1 finish being space-division multiplexed and/or sharing power to be transmitted, the IAB_1 resumes the total power before transmitting the indication information and broadcasts the total power on the access link.

The resuming the transmit power of the network device before the network device transmits the indication information may be specifically implemented in the following manners.

1) transmitting downlink control information (DCI) or radio resource control (RRC) signaling or medium access control control element (MAC CE) signaling, where the DCI or the RRC signaling or the MAC CE signaling is used to indicate that the transmit power of the access link of the network device resumes the transmit power before the network device transmits the indication information. That is, the UE or a next-hop node is informed by using a signaling indication that the network device resumes the transmit power of the access link before the network device transmits the indication information.

Or, 2) automatically resuming the transmit power of the network device before the network device transmits the indication information according to a protocol when a time instant at which the backhaul link and the access link of the network device finish being space-division multiplexed and/or sharing power to be transmitted arrives. That is, it may be agreed in advance that when the backhaul link and the access link of the network device finish being space-division multiplexed and/or sharing power to be transmitted, the transmit power before the network device transmits the indication information is automatically resumed on the access link.

Figure 8:
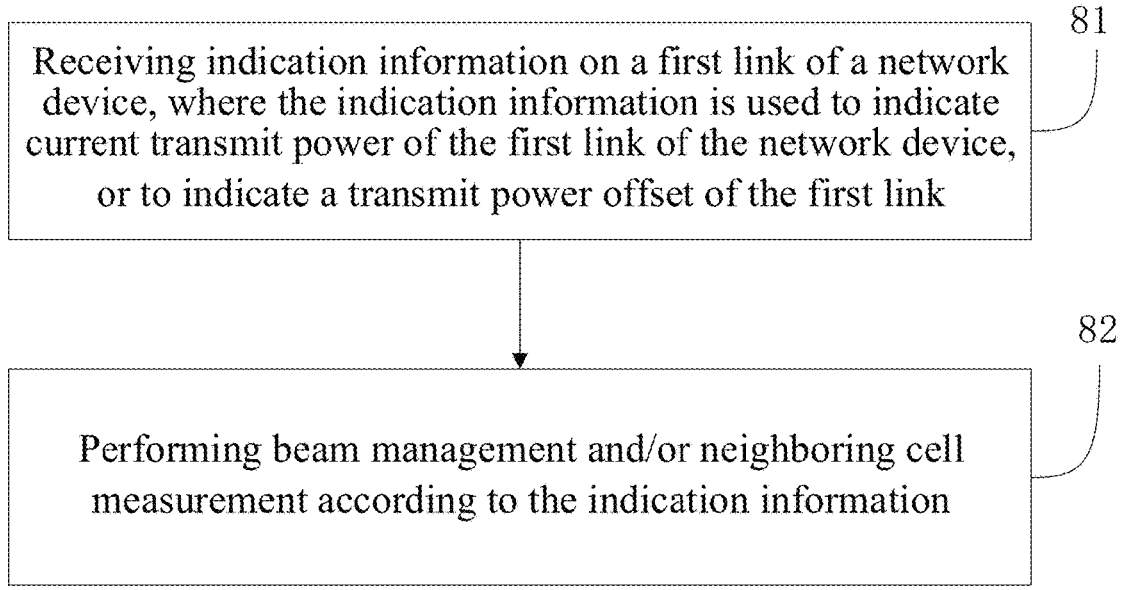
FIG. 8 is a schematic flowchart illustrating a transmit power indication method applied to UE according to the present disclosure.

As shown in FIG. 8, a transmit power receiving method is further provided in some embodiments of the present disclosure. The method is applied to an access device and includes: step 81, receiving indication information on a first link of a network device, where the indication information is used to indicate current transmit power of the first link of the network device, or to indicate a transmit power offset of the first link, where the transmit power offset is a difference between the current transmit power of the first link and transmit power of the network device before the network device transmits the indication information.

The receiving the indication information on the first link of the network device includes: in a case that a second link and the first link of the network device are space-division multiplexed and/or share power to be transmitted, receiving the indication information on the first link of the network device.

The first link is an access link between the network device and UE or an access link between the network device and a next hop node of the network device, and the second link is a backhaul link between the network device and a previous hop node of the network device.

Backhaul power of the backhaul link is less than or equal to a transmit power offset of the access link.

In a case that the network device has at least two backhaul links, a sum of the backhaul power of the at least two backhaul links of the network device is less than or equal to the transmit power offset of the first link.

In a case that the previous hop node on the second link of the network device is switched from a first node to a second node, the indication information is used to indicate updated current transmit power or an updated transmit power offset of the first link of the network device.

The current transmit power is less than or equal to the transmit power of the network device before the network device transmits the indication information minus backhaul power of the backhaul link.

The transmit power receiving method further includes: step 82, performing beam management and/or neighboring cell measurement according to the indication information.

Specifically, when the indication information indicates the transmit power of the access link, the beam management and/or the neighboring cell measurement are directly performed according to the transmit power. When the indication information indicates the transmit power offset of the access link, the transmit power offset may be subtracted from the total power received previously to acquire the transmit power of the access link, and the beam management and the neighboring cell measurement are performed according to the transmit power.

Further, in the embodiment, in a case that a previous hop node of the backhaul link of the network device is switched from a first node to a second node, i.e., in a case that a previous hop node of the second link of the network device is switched from a first node to a second node, the indication information is used to indicate updated current transmit power or an updated transmit power offset of the first link of the network device. The UE may perform beam management and/or neighboring cell measurement according to the updated current transmit power, or acquires a current transmit power of access link according to the updated transmit power offset and the total power received previously to perform beam management and/or neighboring cell measurement according to the transmit power.

The embodiment of the present disclosure is a method which is applied to the UE or the next hop node and corresponds to the above-mentioned method applied to the network device. Specifically, the UE or the next hop node may receive the transmit power or transmit power offset of the access link by using radio resource control RRC signaling or a media access control control element MAC CE Signaling.

All the implementations of the method applied to the network device may be applicable to the embodiment, and same technical effects may be achieved.

A network device is further provided in some embodiments of the present disclosure. The network device includes: a transceiver, configured to transmit indication information on a first link of the network device, where the indication information is used to indicate current transmit power of the first link of the network device, or to indicate a transmit power offset of the first link, where the transmit power offset is a difference between the current transmit power of the first link and transmit power of the network device before the network device transmits the indication information.

The transceiver is specifically configured to: in a case that a second link and the first link of the network device are space-division multiplexed and/or share power to be transmitted, transmit the indication information on the first link of the network device.

The network device here may be a base station, and a relay station may be a node with backhaul capability, such as IAB. The embodiment is a device corresponding to the foregoing method applied to the network device, and all the implementations of the above method embodiment are applicable to embodiments of the network device, and same technical effects may also be achieved. The network device may further include: a processor, etc. The processor is connected to the transceiver via a bus or an interface.

An access device is further provided in some embodiments of the present disclosure. The access device may be UE or a next-hop node on an access link. The access device includes: a transceiver, configured to receive indication information on a first link of a network device, where the indication information is used to indicate current transmit power of the first link of the network device, or to indicate a transmit power offset of the first link, where the transmit power offset is a difference between the current transmit power of the first link and transmit power of the network device before the network device transmits the indication information.

The transceiver is specifically configured to: in a case that a second link and the first link of the network device are space-division multiplexed and/or share power to be transmitted, receive the indication information on the first link of the network device.

The embodiment of the access device may further include a processor, a memory, etc. The transceiver and the processor are in communication connection via a bus interface or an interface, and the transceiver and the memory may also be in communication connection via the bus interface or an interface. Functions of the transceiver may also be implemented by the processor.

Figure 9:
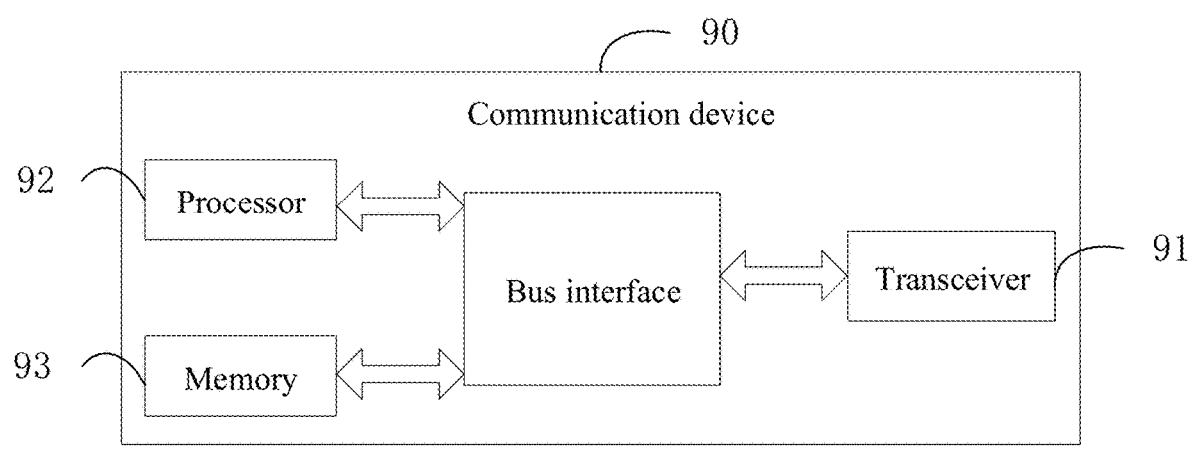
FIG. 9 is a schematic structural diagram of a communication device according to the present disclosure.

As shown in FIG. 9, a communication device 90 according to the present disclosure includes: a processor 92 and a memory 93 storing therein a computer program. The processor 92 is configured to execute the computer program to implement the methods described in the foregoing embodiments.

It should be noted that, the communication device may further include a transceiver 91, which is in communication connection with the processor 92 via a bus interface or an interface, and the transceiver 91 and the memory 93 may also be in communication connection via a bus interface or an interface. Functions of the transceiver may also be implemented by the processor. The communication device according to the present disclosure may further include other components that implement the above methods, such as a user interface. All implementations of the above method embodiments are applicable to embodiments of the communication device, and same technical effects may also be achieved. The communication device may be the UE described in the above embodiments, or the network device described in the above embodiments, e.g., the base station or a relay node.

A computer readable storage medium is further provided in some embodiments of the present disclosure. The computer readable storage medium includes instructions, where the instructions are configured to be executed by a processor to implement the methods described above.

A person skilled in the art may be aware that, the exemplary units and algorithm steps described in connection with the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the disclosure.

It may be clearly understood by a person skilled in the art that, for ease of description and conciseness, for a detailed working process of the foregoing system, apparatus, and unit, reference may be made to a corresponding process in the foregoing method embodiments, and details are not described herein again.

In the several embodiments provided in the present application, it should be understood that the disclosed device and method may be implemented in other manners. For example, the described device embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the devices or units may be implemented in electric, mechanical, or other forms.

The units described as separate parts may or may not be physically separate, and parts displayed as units may or may not be physical units, that is, may be located in one position, or may be distributed on a plurality of network units. A part or all of the units may be selected according to actual needs to achieve the objectives of the solutions of the embodiments.

In addition, functional units in the embodiments of the present disclosure may be integrated into one processing unit, or each of the units may exist alone physically, or two or more units may be integrated into one unit.

If the functions are implemented in a form of a software functional unit and sold or used as an independent product, the functions may be stored in a computer-readable storage medium. Based on such an understanding, the technical solutions of the present disclosure essentially, or the part contributing to the prior art, or a part of the technical solutions may be implemented in a form of a software product. The software product is stored in a storage medium, and includes several instructions for instructing a computer device (which may be a personal computer, a server, or a network device) to perform all or a part of the steps of the methods described in the embodiments of the disclosure. The foregoing storage medium includes any medium that can store program code, such as a universal serial bus (USB) flash drive, a removable hard disk, an ROM, an RAM, a magnetic disk, or an optical disc.

In addition, it should be appreciated that, in the device and method of the present disclosure, it is apparent that various components or various steps may be subdivided and/or recombined. The subdivisions and/or re-combinations should be considered as equivalent solutions of the present disclosure. Also, the steps of performing the above-described series of processes may naturally be performed in chronological order in the order illustrated, but not necessarily required to be performed in chronological order, and some steps may be performed in parallel or independently of each other. It should be appreciated that, for a person skilled in the art, all or any of the steps or components of the methods and devices of the present disclosure may be implemented in any computing device (including a processor, a storage medium, etc.) or network of computing devices through hardware, firmware, software, or a combination thereof, and this may be implemented by those of ordinary skill in the art using their basic programming skills after they read the description of the present disclosure.

Accordingly, the objects of the present disclosure may also be achieved by running a program or a set of programs on any computing device. The computing device may be a well-known general purpose device. Accordingly, the objects of the present disclosure may also be realized by merely providing a program product including program code for implementing the method or device. In other words, such a program product also constitutes the present disclosure, and a storage medium storing such a program product also constitutes the present disclosure. It will be apparent that the storage medium may be any known storage medium or any storage medium developed in the future. It should also be appreciated that, in the device and method of the present disclosure, it is apparent that various components or steps may be subdivided and/or recombined. The subdivisions and/or re-combinations should be considered as equivalent solutions of the present disclosure. Also, the steps of performing the series of processes described above may naturally be performed in chronological order in the order illustrated, but not necessarily required to be performed in chronological order. Certain steps may be performed in parallel or independently of one another.

The above descriptions merely describe optional implementations of the present disclosure. It is appreciated, modifications and improvements may be made by a person of ordinary skill in the art without departing from the principle of the present disclosure, and these modifications and improvements shall fall within the scope of the present disclosure.

What is claimed is:

1. A transmit power indication method, applied to a network device, comprising:

transmitting indication information on a first link of the network device, wherein the indication information is used to indicate current transmit power of the first link of the network device, or to indicate a transmit power offset of the first link, wherein the transmit power offset is a difference between the current transmit power of the first link and transmit power of the network device before the network device transmits the indication information;

wherein the transmitting the indication information on the first link of the network device comprises: in a case that a second link and the first link of the network device are space-division multiplexed and/or share power to be transmitted, transmitting the indication information on the first link of the network device;

wherein the first link is an access link between the network device and UE or a next hop node of the network device, and the second link is a backhaul link between the network device and a previous hop node of the network device;

wherein a backhaul power of the backhaul link is less than or equal to a transmit power offset of the access link;

wherein, in a case that the network device has at least two backhaul links, a sum of the backhaul power of the at least two backhaul links of the network device is less than or equal to the transmit power offset of the first link.

2. The transmit power indication method according to claim 1, wherein in a case that the previous hop node on the second link of the network device is switched from a first node to a second node, the indication information is used to indicate updated current transmit power or an updated transmit power offset of the first link of the network device.

3. The transmit power indication method according to claim 1, wherein the current transmit power is less than or equal to the transmit power of the network device before the network device transmits the indication information minus backhaul power of the backhaul link.

4. The transmit power indication method according to claim 1, further comprising:

when the backhaul link and the access link of the network device finish being space-division multiplexed and/or sharing power to be transmitted, resuming the transmit power of the network device before the network device transmits the indication information.

5. The transmit power indication method according to claim 4, wherein the resuming the transmit power of the network device before the network device transmits the indication information comprises:

transmitting downlink control information (DCI) or radio resource control (RRC) signaling or medium access control control element (MAC CE) signaling, wherein the DCI or the RRC signaling or the MAC CE signaling is used to indicate that transmit power of the access link of the network device resumes the transmit power of the network device before the network device transmits the indication information; or resuming the transmit power of the network device before the network device transmits the indication information automatically according to a protocol when a time instant at which the backhaul link and the access link of the network device finish being space-division multiplexed and/or sharing power to be transmitted arrives.

6. The transmit power indication method according to claim 1, wherein the transmitting the indication information comprises:

transmitting the indication information via radio resource control (RRC) signaling or medium access control control element (MAC CE) signaling or downlink control information (DCI).

7. The transmit power indication method according to claim 1, wherein the current transmit power is used to transmit a synchronization signal and PBCH block (SSB) and/or a channel state information reference symbol (CSI-RS).

8. A communication device, comprising: a processor and a memory storing therein a computer program, wherein the processor is configured to execute the computer program to implement the method according to claim 1.

9. A transmit power receiving method, applied to an access device, comprising:

receiving indication information on a first link of a network device, wherein the indication information is used to indicate current transmit power of the first link of the network device, or to indicate a transmit power offset of the first link, wherein the transmit power offset is a difference between the current transmit power of the first link and transmit power of the network device before the network device transmits the indication information;

wherein the receiving the indication information on the first link of the network device comprises: in a case that a second link and the first link of the network device are space-division multiplexed and/or share power to be transmitted, receiving the indication information on the first link of the network device;

wherein the first link is an access link between the network device and UE or a next hop node of the network device, and the second link is a backhaul link between the network device and a previous hop node of the network device;

wherein backhaul power of the backhaul link is less than or equal to a transmit power offset of the access link;

wherein, in a case that the network device has at least two backhaul links, a sum of the backhaul power of the at least two backhaul links of the network device is less than or equal to the transmit power offset of the first link.

10. The transmit power receiving method according to claim 9, wherein in a case that the previous hop node on the second link of the network device is switched from a first node to a second node, the indication information is used to indicate updated current transmit power or an updated transmit power offset of the first link of the network device.

11. The transmit power receiving method according to claim 9, wherein the current transmit power is less than or equal to the transmit power of the network device before the network device transmits the indication information minus backhaul power of the backhaul link.

12. A communication device, comprising: a processor and a memory storing therein a computer program, wherein the processor is configured to execute the computer program to implement the method according to claim 9.

13. A transmit power indication method, applied to a network device, comprising:

transmitting indication information on a first link of the network device, wherein the indication information is used to indicate current transmit power of the first link of the network device, or to indicate a transmit power offset of the first link, wherein the transmit power offset is a difference between the current transmit power of the first link and transmit power of the network device before the network device transmits the indication information;

wherein the transmitting the indication information on the first link of the network device comprises: in a case that a second link and the first link of the network device are space-division multiplexed and/or share power to be transmitted, transmitting the indication information on the first link of the network device;

wherein the first link is an access link between the network device and UE or a next hop node of the network device, and the second link is a backhaul link between the network device and a previous hop node of the network device; and wherein in a case that the previous hop node on the second link of the network device is switched from a first node to a second node, the indication information is used to indicate updated current transmit power or an updated transmit power offset of the first link of the network device.

14. The transmit power indication method according to claim 13, wherein a backhaul power of the backhaul link is less than or equal to a transmit power offset of the access link.

15. The transmit power indication method according to claim 13, wherein the current transmit power is less than or equal to the transmit power of the network device before the network device transmits the indication information minus backhaul power of the backhaul link.

16. The transmit power indication method according to claim 13, further comprising:

when the backhaul link and the access link of the network device finish being space-division multiplexed and/or sharing power to be transmitted, resuming the transmit power of the network device before the network device transmits the indication information.

17. The transmit power indication method according to claim 16, wherein the resuming the transmit power of the network device before the network device transmits the indication information comprises:

transmitting downlink control information (DCI) or radio resource control (RRC) signaling or medium access control control element (MAC CE) signaling, wherein the DCI or the RRC signaling or the MAC CE signaling is used to indicate that transmit power of the access link of the network device resumes the transmit power of the network device before the network device transmits the indication information; or resuming the transmit power of the network device before the network device transmits the indication information automatically according to a protocol when a time instant at which the backhaul link and the access link of the network device finish being space-division multiplexed and/or sharing power to be transmitted arrives.

18. The transmit power indication method according to claim 13, wherein the transmitting the indication information comprises:

transmitting the indication information via radio resource control (RRC) signaling or medium access control control element (MAC CE) signaling or downlink control information (DCI).

19. The transmit power indication method according to claim 13, wherein the current transmit power is used to transmit a synchronization signal and PBCH block (SSB) and/or a channel state information reference symbol (CSI-RS).

20. A non-transitory computer readable storage medium, comprising instructions, wherein the instructions are configured to be executed by a processor to implement the method according to claim 13.

* * * * *